(12) United States Patent
Reuther

(10) Patent No.: US 9,317,314 B2
(45) Date of Patent: Apr. 19, 2016

(54) TECHNIQUES FOR MIGRATING A VIRTUAL MACHINE USING SHARED STORAGE

(75) Inventor: Lars Reuther, Kirkland, WA (US)

(73) Assignee: Microsoft Techology Licensing, LLC, Redmond, WA (US)

( * ) Notice: Subject to any disclaimer, the term of this patent is extended or adjusted under 35 U.S.C. 154(b) by 796 days.

(21) Appl. No.: 12/826,264

(22) Filed: Jun. 29, 2010

(65) Prior Publication Data

US 2011/0320556 A1     Dec. 29, 2011

(51) Int. Cl.
*G06F 15/167* (2006.01)
*G06F 9/455* (2006.01)
*G06F 9/48* (2006.01)
*G06F 9/50* (2006.01)

(52) U.S. Cl.
CPC .......... *G06F 9/45558* (2013.01); *G06F 9/4856* (2013.01); *G06F 9/5016* (2013.01); *G06F 2009/4557* (2013.01); *Y02B 60/142* (2013.01); *Y02B 60/144* (2013.01); *Y02B 60/162* (2013.01)

(58) Field of Classification Search
CPC .............. G06F 9/4553; G06F 9/45558; G06F 2009/4557; G06F 3/0631; G06F 3/0647
USPC ............................ 709/213, 215, 224; 718/104
See application file for complete search history.

(56) References Cited

U.S. PATENT DOCUMENTS

| | | | |
|---|---|---|---|
| 7,313,793 B2 * | 12/2007 | Traut et al. .................... | 718/1 |
| 7,383,405 B2 | 6/2008 | Vega et al. | |
| 7,536,525 B2 * | 5/2009 | Chandrasekaran et al. .. | 711/165 |
| 8,151,263 B1 * | 4/2012 | Venkitachalam et al. ........ | 718/1 |
| 2006/0005189 A1 * | 1/2006 | Vega et al. .................... | 718/1 |
| 2006/0026383 A1 * | 2/2006 | Dinechin et al. .............. | 711/207 |
| 2009/0064136 A1 | 3/2009 | Dow et al. | |
| 2009/0125904 A1 | 5/2009 | Nelson | |
| 2009/0307447 A1 * | 12/2009 | Jacobs et al. ................... | 711/162 |
| 2009/0307456 A1 * | 12/2009 | Patwari et al. ................. | 711/173 |
| 2009/0313445 A1 * | 12/2009 | Pandey et al. .................. | 711/162 |
| 2010/0070978 A1 | 3/2010 | Chawla et al. | |
| 2011/0066786 A1 * | 3/2011 | Colbert .............................. | 711/6 |
| 2011/0145471 A1 * | 6/2011 | Corry et al. ....................... | 711/6 |
| 2011/0209146 A1 * | 8/2011 | Box et al. .......................... | 718/1 |

OTHER PUBLICATIONS

Windows Server, Mar. 31, 2009. "What's New in Failover Clusters in Windows Server 2008 R2." Retrieved on Aug. 24, 2015 from <https://technet.microsoft.com/en-us/library/Dd621586(v=WS.10).aspx>.*
"Live Storage Migration for Virtual Machines", www.vmware.com-technical-resources-virtual-storage-live-migration.html', accessed Mar. 25, 2010, 1-3.
"Migration", KVM, www.linux-kvm.org-page-Migration, accessed Mar. 25, 2010, 1-6.
"What's New in Hyper-v in Windows Server 2008 R2", www.technet.microsoft.com-en-us-library-dd446676(WS.10,printer).aspx, accessed Mar. 25, 2010, 1-3.
"XEN Virtual Machine Migration", Novell User Communities, www.novell.com-communities-node-5050-xen-virtual-machine-migration, accessed Mar. 25, 2010, 1-4.

* cited by examiner

*Primary Examiner* — Brian J Gillis
*Assistant Examiner* — Juan C Turriate Gastulo
(74) *Attorney, Agent, or Firm* — John Jardine; Kate Drakos; Micky Minhas

(57) ABSTRACT

Techniques for providing the ability to live migrate a virtual machine from one physical host to another physical host employ shared storage as the transfer medium for the state of the virtual machine. In addition, the ability for a virtualization module to use second-level paging functionality is employed, paging-out the virtual machine memory content from one physical host to the shared storage. The content of the memory file can be restored on another physical host by employing on-demand paging and optionally low-priority background paging from the shared storage to the other physical host.

20 Claims, 14 Drawing Sheets

TECHNIQUES FOR MIGRATING A VIRTUAL MACHINE USING SHARED STORAGE

BACKGROUND

When a guest operating system is supported on a host, the guest operating system can run in what is called a "virtual machine," as the guest operating system does not have control to the physical hardware of the computer system. A virtual machine management system (sometimes referred to as a virtual machine monitor or a hypervisor) is also often employed to manage one or more virtual machines so that multiple virtual machines can run on a single computing device concurrently. The virtual machine management system runs directly on the native hardware and virtualizes the resources of the machine. A host operating system and a virtual machine management system may run side-by-side on the same physical hardware. For purposes of clarity will we use the term virtualization module to refer to all incarnations of a virtual machine management system.

The abstraction of the virtual machine from the underlying hardware provides for flexible resource allocation and facilitates the ability to move, or "migrate," virtual machines from one host machine to another. Being able to migrate a virtual machine quickly and easily from one host machine to another is useful, for example, for "load balancing" systems, performing hardware or software upgrades, or handling disaster recovery. More specifically, if a virtual machine requires more processing power than is available on one host machine, it can be moved to another host machine that has extra capacity. Moreover, if the host computer system requires hardware maintenance or a software upgrade, the virtual machine may be migrated from one physical computer system to another temporarily, which thereby allows the first physical computer system to be taken down and upgraded. Similarly, in the case of power outage a limited amount of power is available in the backup batteries, all virtual machines of a datacenter can be migrated to another datacenter and then migrated back when the power is restored. Additionally, virtual machines facilitate the offloading of enterprise operations to a hosted datacenter simply to reduce the need for maintaining and upgrading resources.

Live migration of a virtual machine is the process of moving the running virtual machine from the physical computer system that hosts the virtual machine at the time the migration is initiated (the source computer system) to another physical computer system (the target computer system) without causing an unreasonable amount downtime, where unreasonable depends on the workload running in the virtual machine. Live migration provides the core technology required for dynamic load balancing, virtual machine placement, high availability for virtualized workloads during physical computer maintenance, and reduced datacenter power consumption, among others.

A common way of implementing live migration is to create a network connection between two physical computer systems, the source computer system and the target computer system, and use this network connection to copy the state of the virtual machine from the source computer system to the target computer system. However, the need for a separate network connection creates overhead costs, such as administration costs associated with the management of firewalls. In addition, when a separate network connection is required for isolation of migration traffic from other network traffic for capacity or security reasons, there are infrastructure costs associated with setting up this separate network topology.

SUMMARY

Techniques are disclosed for using storage shared between a source computer system and a target computer system to migrate the state of the virtual machine. In an embodiment, paging functionality of the virtualization module can be leveraged in an iterative process on the source computer system by paging-out the content of the virtual machine's memory to a shared storage medium and restoring the content of the memory from the shared storage medium to the target computer system. In an exemplary embodiment, a page file can be used to transfer the state of the virtual machine from the source computer system to the target computer system. In another embodiment, instead of a page file, a saved-state file can be used to transfer the state of the virtual machine from the source computer system to the target computer system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The systems, methods, and computer-readable media for live migration of a virtual machine are further described with reference to the accompanying drawings in which.

DETAILED DESCRIPTION

Figure 1:
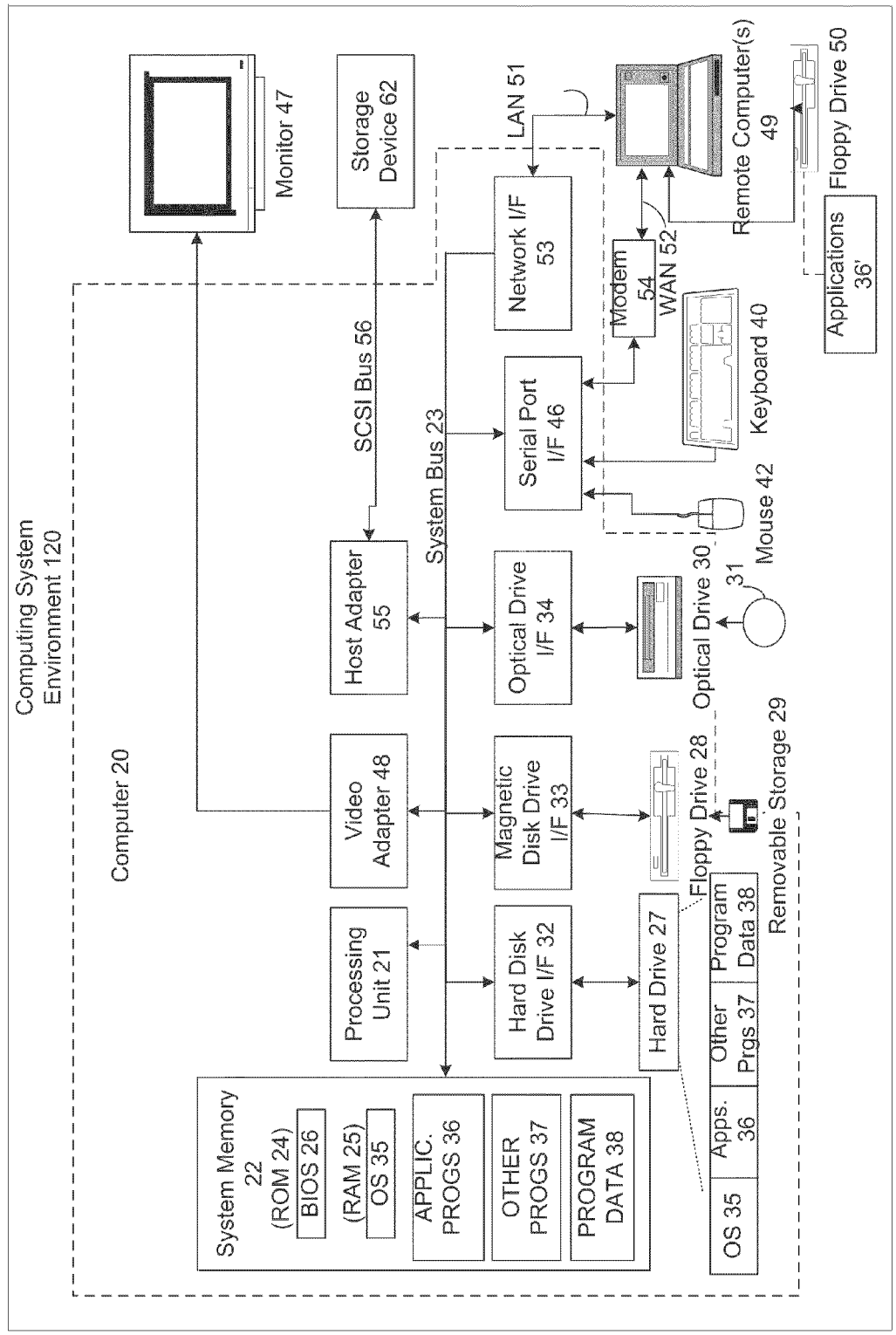
FIG. 1 illustrates an exemplary general purpose computing environment in which the techniques described herein may be embodied.

FIG. 1 is a block diagram of a general purpose computer system in which the techniques described herein may be employed. The computer system 120 is only one example of a suitable computing environment and is not intended to suggest any limitation as to the scope of use or functionality of the presently disclosed subject matter. Neither should the computer system 120 be interpreted as having any dependency or requirement relating to any one or combination of components illustrated in the exemplary operating environment. In some embodiments, the various depicted computing elements may include circuitry configured to instantiate specific aspects of the present disclosure. For example, the term circuitry used herein can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware and software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary computer system 120 is depicted. The computer system can include a conventional computer 20 or the like, including at least one processor or processing unit 21, a system memory 22, and a system bus 23 that communicatively couples various system components including the system memory to the processing unit 21. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system (BIOS) 26, containing the basic routines that help to transfer information between elements within the computer 20, such as during start up, is stored in ROM 24. The computer 20 may further include a hard disk drive 27 for reading from and writing to a hard disk (not shown), a magnetic disk drive (e.g. floppy drive) 28 for reading from or writing to a removable magnetic disk (e.g. removable storage) 29, and an optical disk drive 30 for reading from or writing to a removable optical disk 31, such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules, and other data for the computer 20. Although the exemplary environment described herein employs a hard disk, a removable magnetic disk 29, and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like may also be used in the exemplary operating environment. Generally, such computer readable storage media can be used in some embodiments to store processor executable instructions embodying aspects of the present disclosure.

A number of program modules comprising computer-readable instructions may be stored on computer-readable media such as the hard disk, magnetic disk 29, optical disk 31, ROM 24, or RAM 25, including an operating system 35, one or more application programs 36, other program modules 37, and program data 38. Upon execution by the processing unit, the computer-readable instructions cause the actions described in more detail below to be carried out or cause the various program modules to be instantiated. A user may enter commands and information into the computer 20 through input devices such as a keyboard 40 and pointing device (e.g. mouse) 42. Other input devices (not shown) may include a microphone, joystick, game pad, satellite disk, scanner, or the like. These and other input devices are often connected to the processing unit 21 through a serial port interface 46 that is coupled to the system bus 23, but may be connected by other interfaces, such as a parallel port, game port, or universal serial bus (USB). A monitor 47 or other type of display device can also be connected to the system bus 23 via an interface, such as a video adapter 48. In addition to the monitor 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device, or other common network node, and typically can include many or all of the elements described above relative to the computer 20, although only a memory storage device (e.g. floppy drive) 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets, and the Internet.

When used in a LAN networking environment, the computer 20 can be connected to the LAN 51 through a network interface or adapter 53. When used in a WAN networking environment, the computer 20 can typically include a modem 54 or other means for establishing communications over the WAN 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
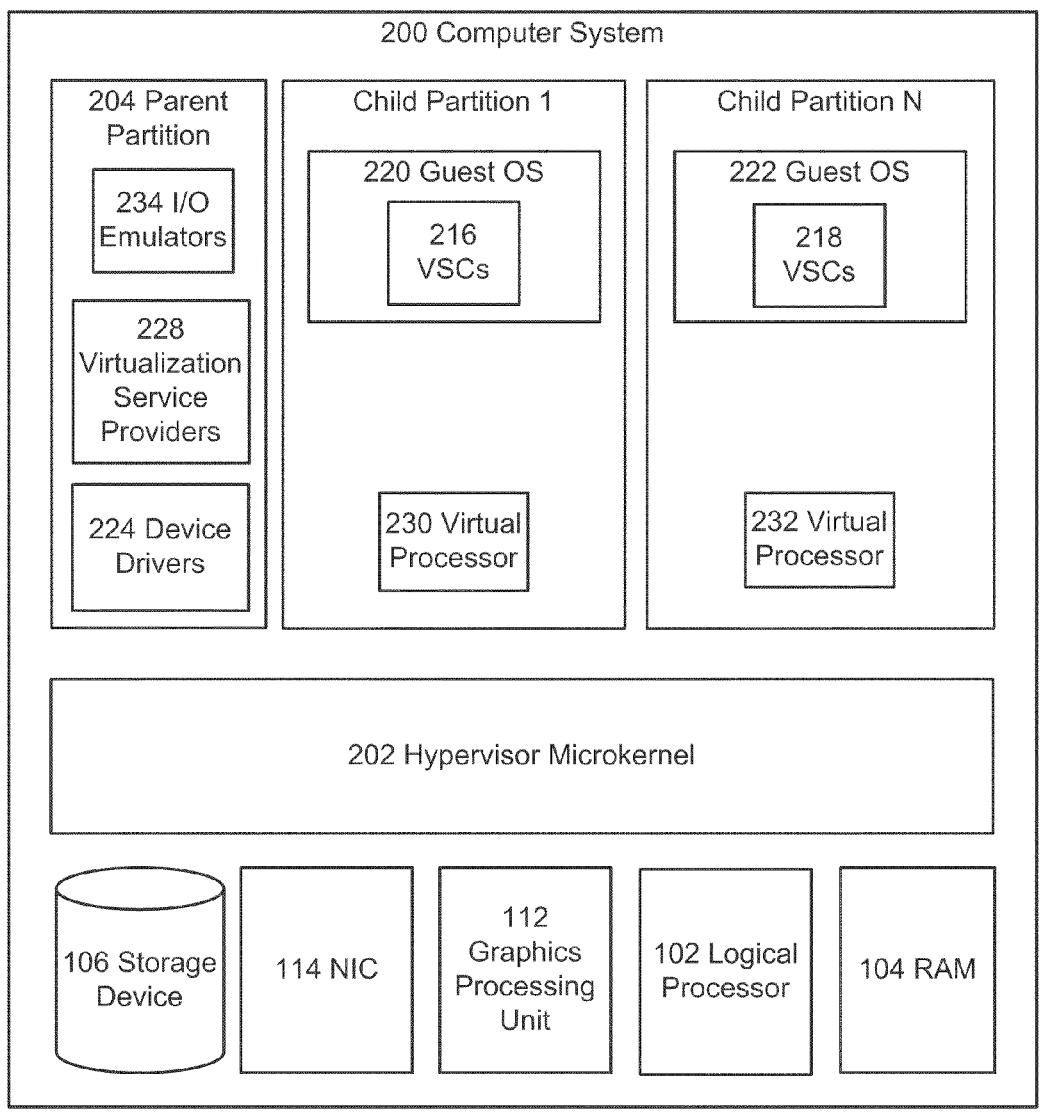
FIG. 2 illustrates a virtualized computing system.

Turning to FIG. 2, hypervisor microkernel 202 can be configured to control and arbitrate access to the hardware of computer system 200, which may have some or all of the components of computer 20 of FIG. 1. Broadly, hypervisor microkernel 202 can generate execution environments called partitions such as child partition 1 through child partition N (where N is an integer greater than 1). In embodiments, a child partition is the basic unit of isolation supported by hypervisor microkernel 202. Hypervisor microkernel 202 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

In the depicted example, this exemplary virtualization architecture can include parent partition component 204, which can also be also thought of as similar to domain 0 of Xen's open source hypervisor. Parent partition 204 in this operational environment can be configured to provide resources to guest operating systems executing in the child partitions 1-N by using virtualization service providers 228 (VSPs) that are typically referred to as back-end drivers in the open source community. Broadly, VSPs 228 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 234, e.g., virtualized IDE devices, virtualized video adaptors, virtualized NICs, etc., can be configured to run within the parent partition 204 and attached to resources available to guest operating systems 220 and 222. For example, when a guest OS touches a register of a virtual device or memory mapped to the virtual device microkernel hypervisor 202 can intercept the request and pass the values the guest attempted to write to an associated emulator.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
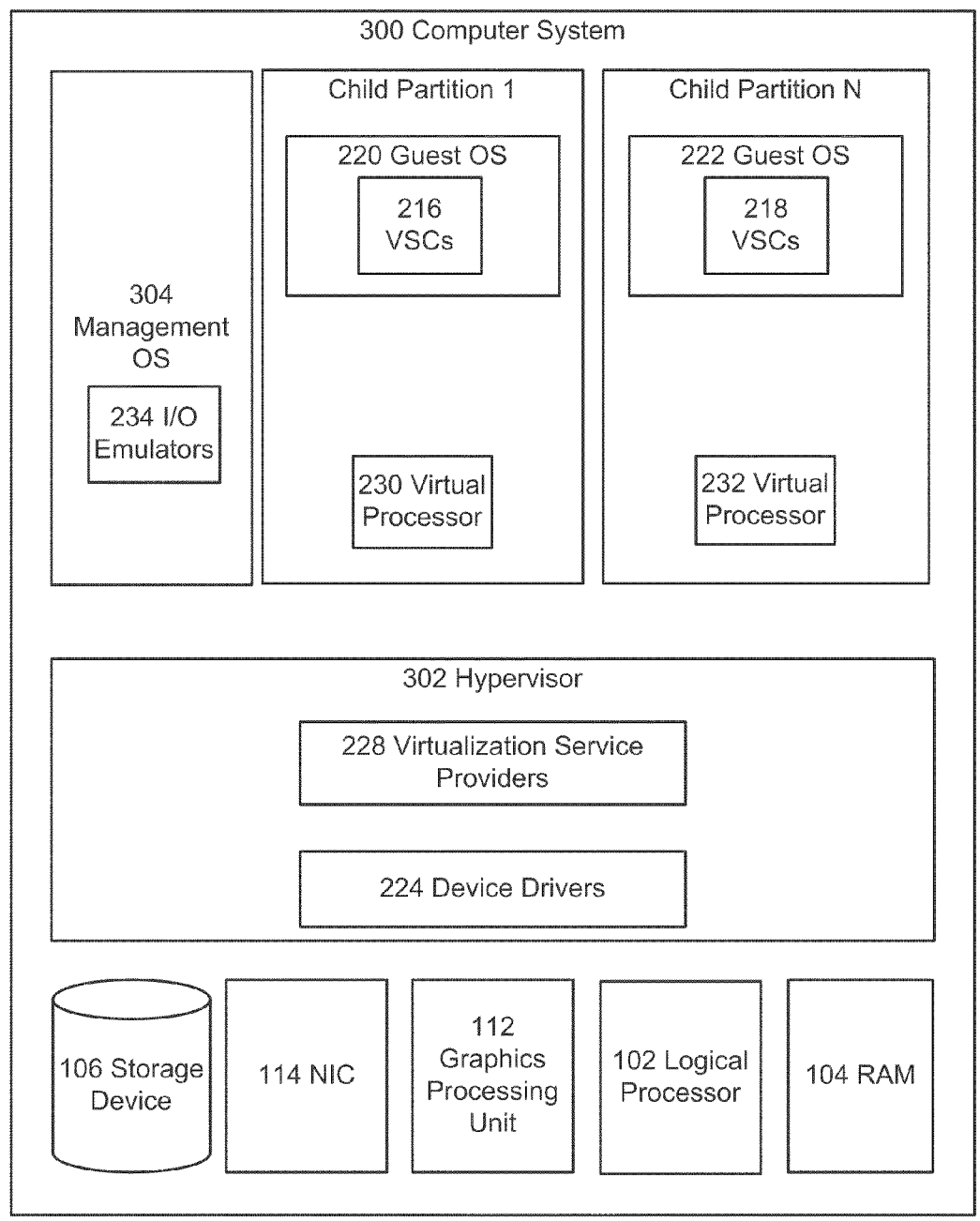
FIG. 3 illustrates a virtualized computing system.

Referring now to FIG. 3, it illustrates an alternative architecture to that described above in FIG. 2. FIG. 3 depicts similar components to those of FIG. 2; however, in this example embodiment hypervisor 302 can include a microkernel component and components similar to those in parent partition 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
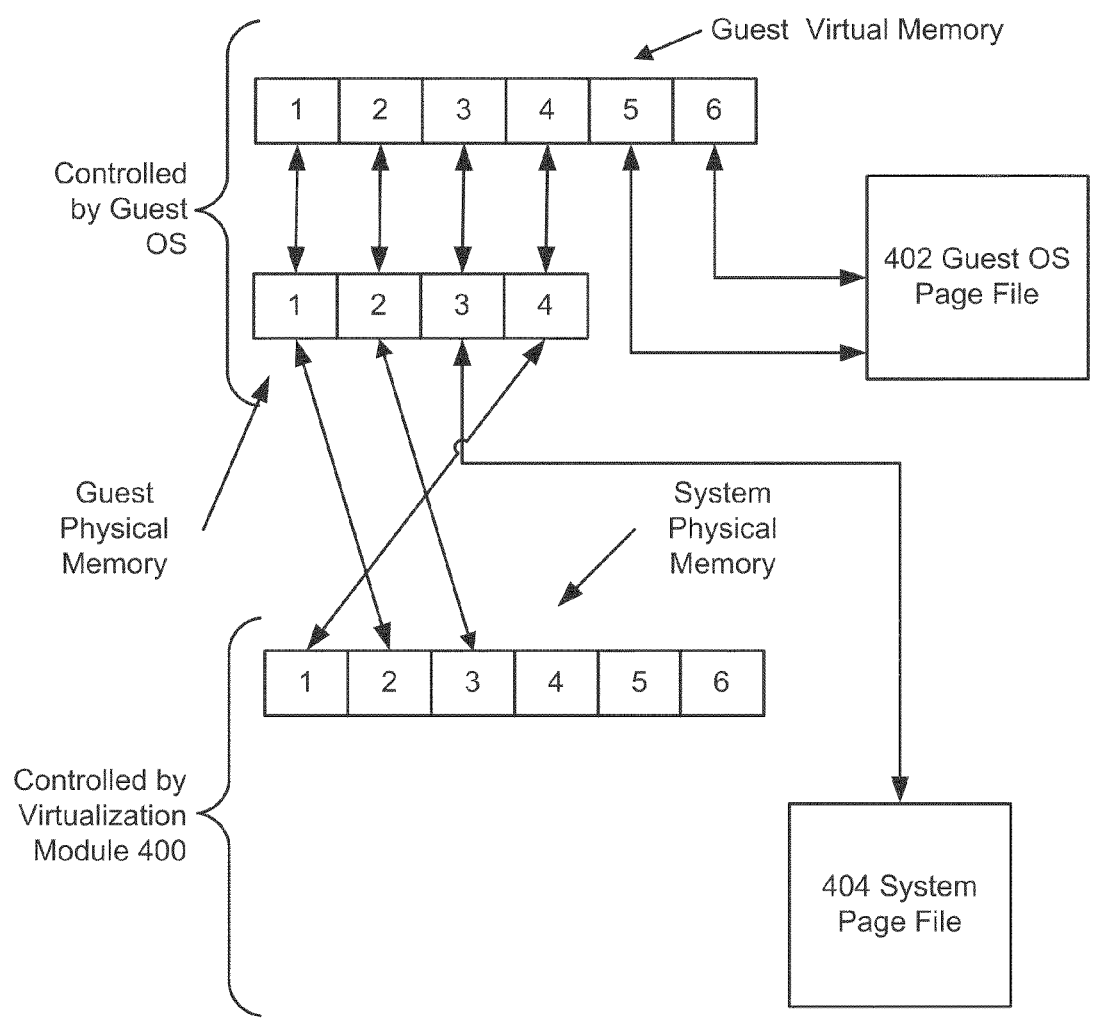
FIG. 4 illustrates how memory can be arranged in a virtualized environment.
Figure 5:
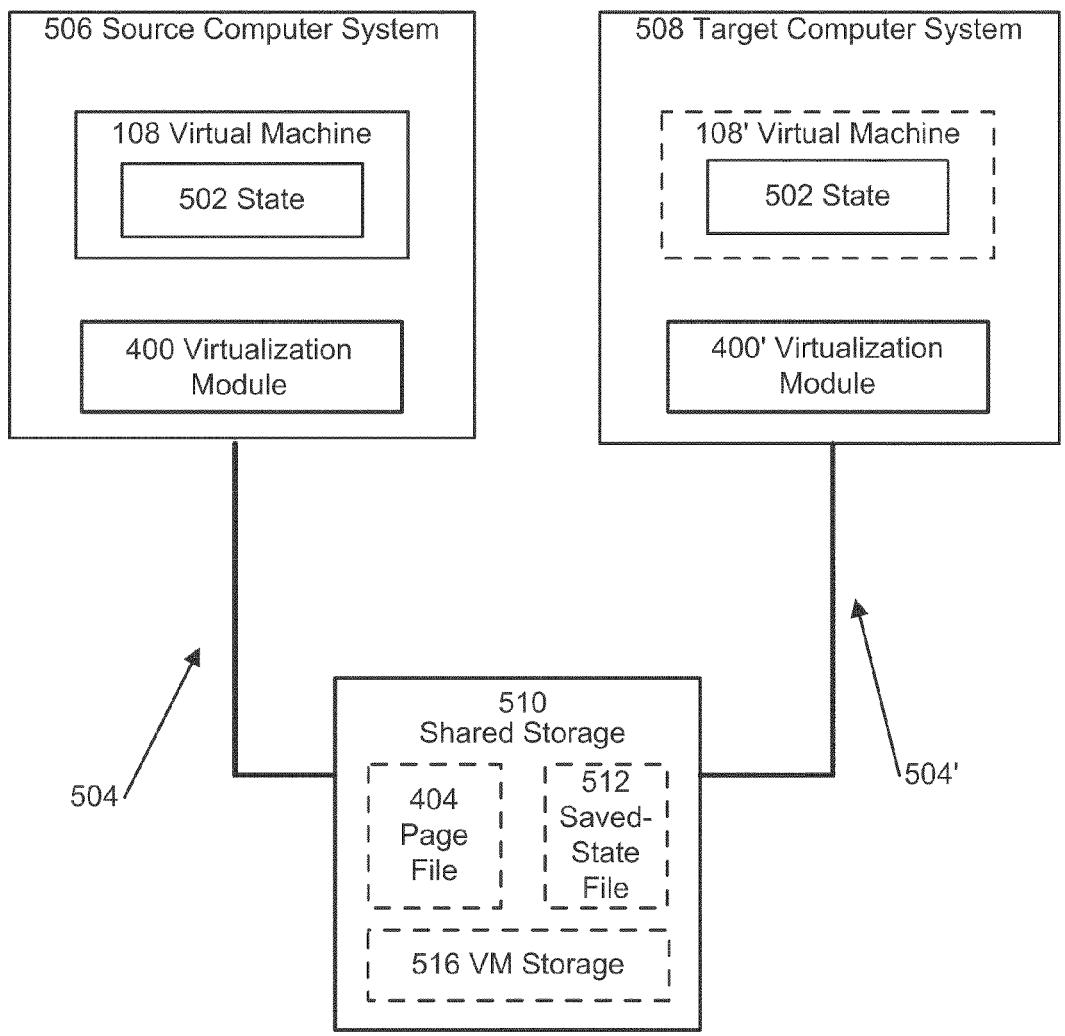
FIG. 5 illustrates an operational environment for migrating a virtual machine from one computer system to another computer system.

Turning to FIG. 4, it illustrates how memory can be managed. Virtualization module 400, which is illustrated in FIG. 5, can enforce partitioning by restricting a guest operating system's view of system memory. In an exemplary embodiment, virtualization module 400 can be hypervisor 302 or microkernel hypervisor 202 operating in conjunction with a host operating system running in a parent partition 204. Guest physical memory (GPM) is a partition's view of memory that is controlled by virtualization module 400, e.g., microkernel hypervisor 202. System physical memory (SPM) is the memory from the view of virtualization module 400. Each block illustrated by the figure represents a page, which is a fixed length block of memory with a starting and ending address. For example, four pages of guest physical memory are allocated to a virtual machine and six pages of system physical memory are available, according to this illustrative figure. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describing a page of memory from the viewpoint of a virtual machine and the term system physical memory is shorthand way of describing a page of memory from the viewpoint of the physical system.

As shown by the figure, guest physical memory can be further virtualized by guest OS into guest virtual memory. The guest OS can move information stored in guest physical memory into page file 402 which can be stored in secondary storage such as in a virtual hard drive in order to free up guest physical memory. Similarly, in an exemplary embodiment employing second-level paging, virtualization module 400 can have access to system virtual pages and a system page file 404 (where a system page file 404 could exist for each virtual machine). Virtualization module 400 can use the system page file 404 to swap information to secondary storage such as a disk.

Second-level paging describes a technique for saving the content of a guest-physical page to a page file managed by the virtualization platform and to reuse the system-physical page that was used to back this guest-physical page for other purposes (in many cases to back another guest-physical page of the VM or another VM, but not necessarily). If the guest accesses a guest-physical page for that the content is currently written to disk, virtualization module 400 can find a system-physical page; read the content back from disk into the page; and backs the guest-physical page with that system-physical page. In a specific example, and referring to FIG. 4, guest virtual memory page 3 can be backed by guest physical memory page 3. Guest physical page 3 may have been previously been backed by system physical page 5; however, virtualization module 400 may have paged the contents of system physical page 5 to system page file 404.

FIG. 5 is a block diagram illustrating an operational environment for practicing aspects of the present disclosure. FIG. 5 shows two instantiations of the system shown in FIGS. 2 or 3 (506 and 508), each including a virtual machine "VM" (108 and 108') and connected to shared storage 510. Shared storage 510 is shown as external to the computer systems, however in embodiments shared storage 510 can be attached to either source computer system 506 or target computer system 508. In this regard, shared storage 510 can be any storage device that can be accessed by both virtualization modules 400 and 400'. Shared storage 510 may include, but is not limited to, Network Attached Storage (NAS) devices, such as Server Message Block (SMB) file shares or a Network File System (NFS), and Storage Area Network (SAN) target that provide Logical Unit Numbers (LUNs). In an embodiment, connection 504 may be an Ethernet connection. In another embodiment, connection 504 may be Small Computer System Interface (SCSI). In yet another embodiment, connection 504 may be Fibre Channel. Connection 504' may use the same or a different protocol than the protocol used for connection 304.

Additionally, the system of FIG. 5 includes target computer system 508, which can include guest physical memory, virtualization module 400', and VM 108'. VM 108' can be instantiated when a migration operation begins and virtualization module 400' can be configured to use state 502 to configure VM 108'.

Generally speaking, there are two states of a virtual machine that may make up the overall saved state 502 of the virtual machine. First, there may be the virtual machine memory content, i.e., the content of the guest physical memory allocated to the virtual machine. Second, there may be the virtual device runtime state. The virtual device runtime state encompasses the virtual devices that make up the state of the virtual machine, such as, but not limited to, the state of any virtual processor(s), outstanding input/outputs (I/Os), the central processing unit (CPU), the video buffer, etc. For example, the state of a virtual device may include the content of video memory that is managed by a virtual video device, or caches managed by virtual disk devices. The runtime state of the virtual devices may be needed before restoring the virtual devices on the target computer system because the virtual machine may not be able to execute without it. In an embodiment, the virtual machine memory content may comprise guest OS page file 402 or in another embodiment guest OS page file 402 may be stored in VM storage 516.

As shown by the figure, state 502 may be stored in shared storage 510 in saved-state file 512 and/or a page file 404. Shared storage 510 can store page file 404 for, for example, a host operating system or hypervisor 302, saved-state file 512, and VM storage 516, e.g., a virtual hard drive file. These three elements are illustrated in dashed lines to indicate that different combinations of these elements may be present in shared storage 510. For example, in an embodiment page file 404 may be used instead of saved state file 512 or vise versa. In another embodiment both may be used. In another embodiment, VM storage 516, e.g., a virtual hard disk file or LUN, may not be present on the same physical storage medium as page file 404 or saved-state file 512. For example, in an embodiment a virtual machine may use a LUN that is not sub-allocated for storage and page file 404 may be stored on a different LUN. In another embodiment, VM storage 516 may be a virtual hard drive file stored on a LUN along with page file 404.

State 502 of VM 103 can be transferred to target computer system 508 using a variety of techniques. One exemplary technique includes using page file 404 for the memory content and saved-state file 512 for the device and processor state. Another technique includes using saved-state file 512 or page file 404 to store both the memory content and the device and processor state. A third approach could be to use the guest physical memory of VM 108' to store the device and processor state, i.e., this state information could be directly transferred from source computer system 506 to target computer system 508, and use page file 404 or saved-state file 512 to transfer the memory content.

Continuing with the description of FIG. 5, in an exemplary embodiment, state 502 of VM 108 can be saved to page file 404 and/or saved-state file 512 in an iterative way while VM 108 is running. The repetition of saving parts of state 502 is used because VM 108 is still modifying state 502 and virtualization module 400 can use a mechanism to identify the parts of state 502 that changed. This process can continue until a threshold is reached. At this point VM 108 is paused and the remaining modified state is written to page file 404 and/or saved-state file 512. The threshold can be defined by several means. For example, it can be based on the size of the remaining modified state, it can be based on a time period, or it could be based on a more elaborate heuristic that aims to minimize the amount of time VM 108 needs to be paused. Thus, in this exemplary embodiment virtualization module 400 can be configured to identify changed parts of state 502 and write them to page file 404 and/or saved-state file 512 using any technique. For example, virtualization module 400 could operate on batches of pages or individual pages. In this exemplary embodiment, virtualization module 400 can be configured send a batch of pages and if a page is touched while saving the batch, virtualization module 400 can be configured to immediately write the touched page to page file 404 and/or saved-state file 512. The threshold to stop the transfer and pause the VM can include a maximum number of save operations (e.g., to enforce that the migration eventually proceeds), but typically combines the maximum number of save operations with additional heuristics.

In another specific example, virtualization module 400 can use a pass-based approach. In this exemplary embodiment, a single iteration can be defined as the process of checking each guest-physical page and writing modified pages to page file 404 and/or saved-state file 512 (usually the pages are checked in the order of their guest-physical addresses), and multiple of theses passes (i.e., iterations) can be performed to save the memory.

The following is a description with reference to a series of flowcharts depicting operational procedures. For ease of understanding, the flowcharts are organized such that initial flowcharts present implementations via an overall "big picture" viewpoint and subsequent flowcharts provide further additions and/or details.

Figure 6:
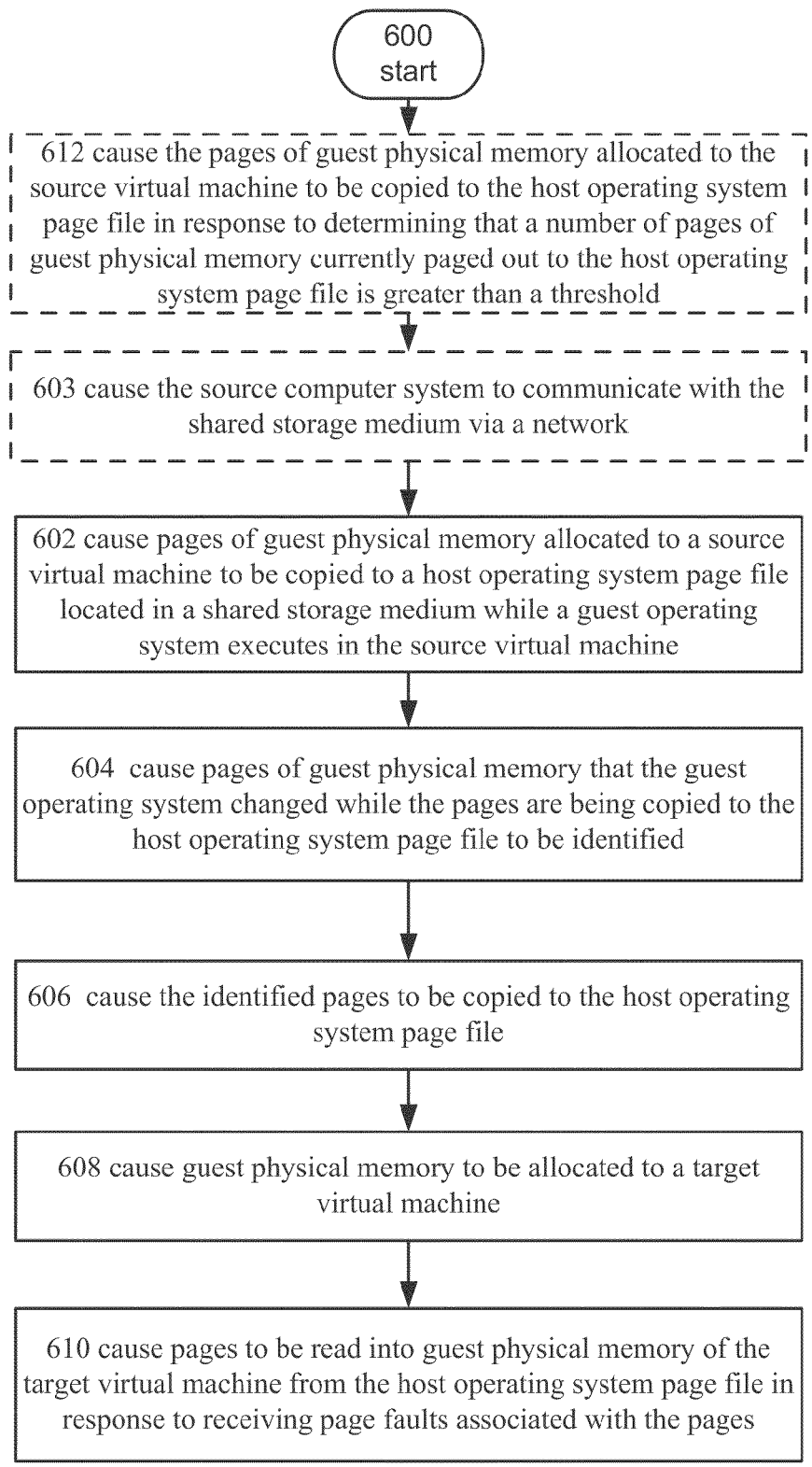
FIG. 6 illustrates an operational procedure.

FIG. 6 shows an illustrative, operational procedure for practicing aspects of the present invention including operations 600-612. Operation 600 begins the operational process, and a migration operation can begin in order to move VM 108 from source computer system 506 to target computer system 508. In operation 602, virtualization module 400 can cause pages of guest physical memory allocated to the source virtual machine to be copied to a host operating system page file located in a shared storage medium while a guest operating system executes in the source virtual machine. Turning back to FIG. 5, in this example, second-level paging may be enabled and page file 404 can be associated with a host operating system running in a computer system having an architecture similar to that in FIG. 2.

When second-level paging is enabled in a virtual machine, some or many of the memory pages in the virtual machine's "physical" memory may already reside in page file 404. Thus, in this exemplary embodiment, second-level paging may enable live migration of a virtual machine to occur more quickly because fewer memory pages will have to be copied from source computer system 506 to shared storage 510 after live migration initiates; the memory pages that have been paged-out to the shared storage page file prior to the initiation of live migration will not have to be copied again to the shared storage because already existing page files are reused. In this exemplary embodiment, virtualization module 400 can be configured to determine which memory pages have not already been paged-out to the shared storage page file and those memory pages can be copied to page file 404.

In an alternative embodiment, and turning back to FIG. 6, operation 603 shows that virtualization module 400 can cause source computer system 506 to communicate with the shared storage medium 510 via network 504. The transfer between source computer system 506 and shared storage 510 and then the between the shared storage 510 and target computer system 508 may be accomplished through a network or Fibre Channel, for example. In this embodiment, a host operating system may have configured page file 404 on shared storage 510, which can be a SAN target.

Because virtual machine 108 continues to run during the save operation, the saved state may be continuously modified. In operation 604, virtualization module 400 can cause pages of guest physical memory that the guest operating system changed while the pages are being copied to the host operating system page file to be identified. In this example, virtualization module 400, e.g., microkernel hypervisor 202, can track the modifications to the saved state by identifying pages of guest physical memory that changed while virtual machine 108 continues to run during the save operation. In operation 606, virtualization module 400 can cause the identified pages to be copied to the host operating system page file. In this embodiment, page file 404, e.g., a host operating system page file, resides in storage accessible to both the source computer system 506 and the target computer system 508.

Virtual machine 108 can be paused and, therefore, no more virtual machine memory content modifications will occur. The state of the virtual machine's virtual devices and the remaining modified state of virtual machine memory content can then be saved to page file 404 in shared storage 510. After this save operation, there is a consistent copy of virtual machine memory content and the state of the virtual machine's virtual devices. Ownership of shared storage 510 can then be transferred from source computer system 506 to target computer system 508. For example, transfer of ownership may include managing the ownership of the shared storage by the masking and unmasking of SAN LUNs.

In operation 608, virtualization module 400' can cause guest physical memory to be allocated to target virtual machine 108' by reading in the guest operating system and the state of the virtual devices necessary for execution of the virtual machine, including the virtual processor state, from page file 404 in shared storage 510. Or put another way, virtualization module 400' can first read in the part of the state that is absolutely necessary to start virtual machine 108'. After virtual machine 108' has been started, as shown by operation 610, virtualization module 400' can cause the remaining state to be read into guest physical memory of the target virtual machine from the host operating system page file in response to receiving page faults associated with the pages.

In an alternative embodiment, when second-level paging is available to virtualization module 400, but it has not already been set up in virtual machine 108 by the virtualization module 400, page file 404 can be created on shared storage 510.

Turning to operation 612, in an exemplary embodiment, virtualization module 400 can migrate using a page file in the instance that a threshold number of pages are already paged out to shared storage. Or put another way, virtualization module 400 can cause the pages of guest physical memory allocated to source virtual machine 506 to be copied to the host operating system page file in response to determining that a number of pages of guest physical memory currently paged out to the host operating system page file is greater than a threshold. In this example, virtual machine memory content is then paged-out to page file 404 using the second-level paging capability available to virtualization module 400. This may be done iteratively because virtual machine 108 continues to run during the save operation, which may continuously modify the saved state.

Figure 7:
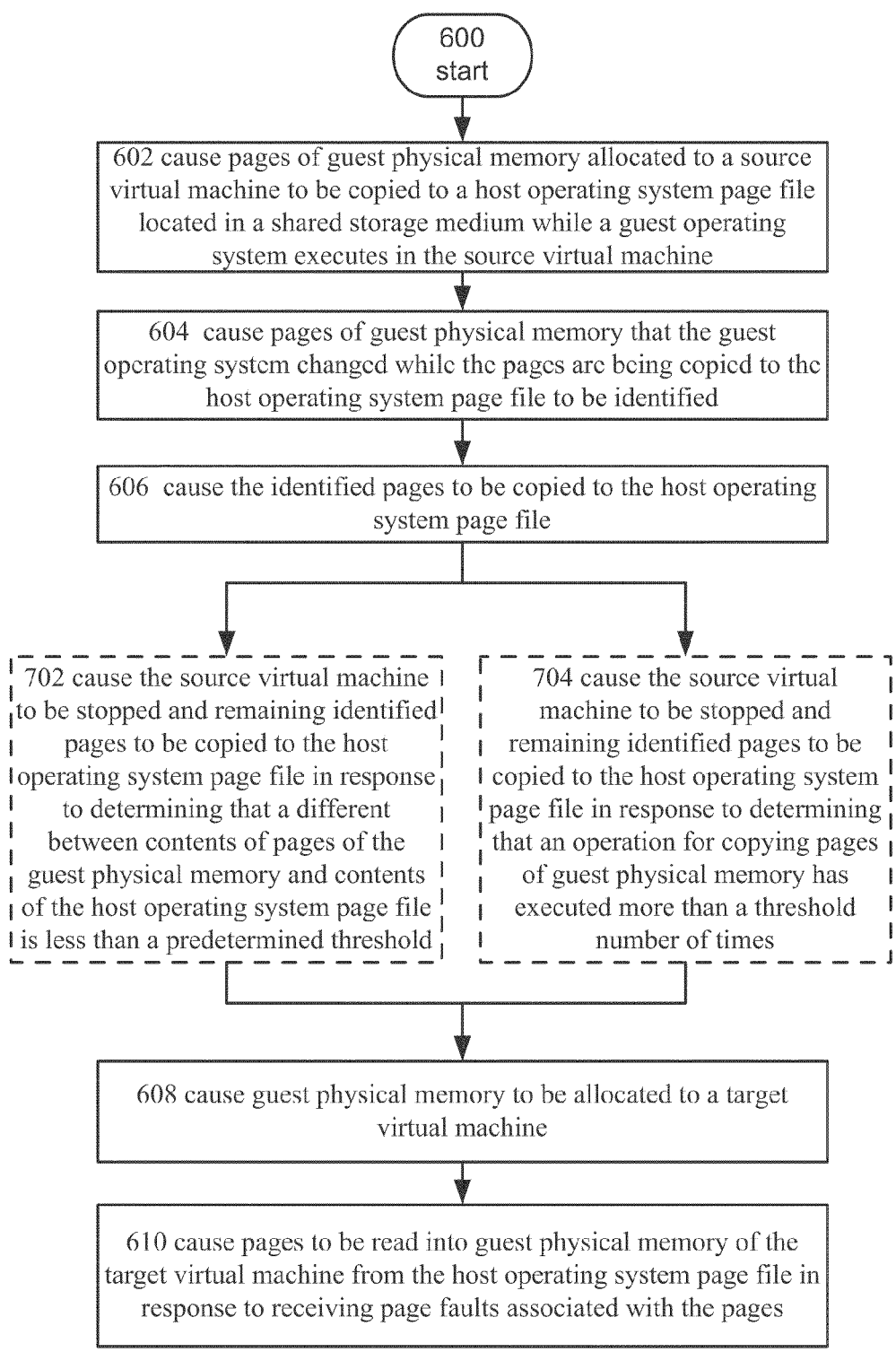
FIG. 7 depicts a generalized flow chart showing migration of a virtual machine using a page file.

FIG. 7 illustrates alternative embodiments of the operational procedure of FIG. 6, including the additional operations 702 and 704. In an embodiment, virtualization module 400 continues to save the modified pages to shared storage 510 until a threshold comparison value is met. Since VM 108 is still running during this save operation, pages that have been modified in the meantime will need to be copied before the migration operation can be finished. Virtualization module 400 identifies the pages that have been modified in the meantime, and then makes a determination whether to continue or to pause VM 108 momentarily while the remaining changed pages are copied to the shared storage medium 510. In an embodiment using save-passes, the threshold can be based on the amount of modified pages after the completion of a pass. In this example, virtualization module 400 can continue copying pages until the number of changes pages is less than a maximum number. In this embodiment, each save pass may become shorter as the number of memory pages being modified decreases. In another embodiment, the threshold can be based on the number of modified pages.

In another embodiment using save-passes, the threshold can be based on a maximum number of save-passes that virtualization module 400 performs. In this example, virtualization module 400 can continue to copy pages until a maximum number of save-passes have been exceeded. In this embodiment, there may a security reason to include a limit to the number of passes that are taken: a malicious virtual machine could indefinitely delay its migration by continually modifying a high number of memory pages. The maximum numbers are implementation dependent. For example, the maximum numbers may be dependent on what an acceptable time is for the virtual machine to be paused. In another exemplary embodiment, virtualization module 400 can continue to copy pages until a maximum time limit elapses. In embodiments, the determination to continue performing save-passes could be made by comparing the number of modified pages against a predetermined threshold amount, by comparing the number of save passes that have already been performed against a predetermined threshold amount, or a combination of the two. Similar to that described above, the threshold to stop the transfer and pause the VM can include a maximum number of passes (e.g., to enforce that the migration eventually proceeds), but typically combines the maximum number of passes with additional heuristics.

Figure 8:
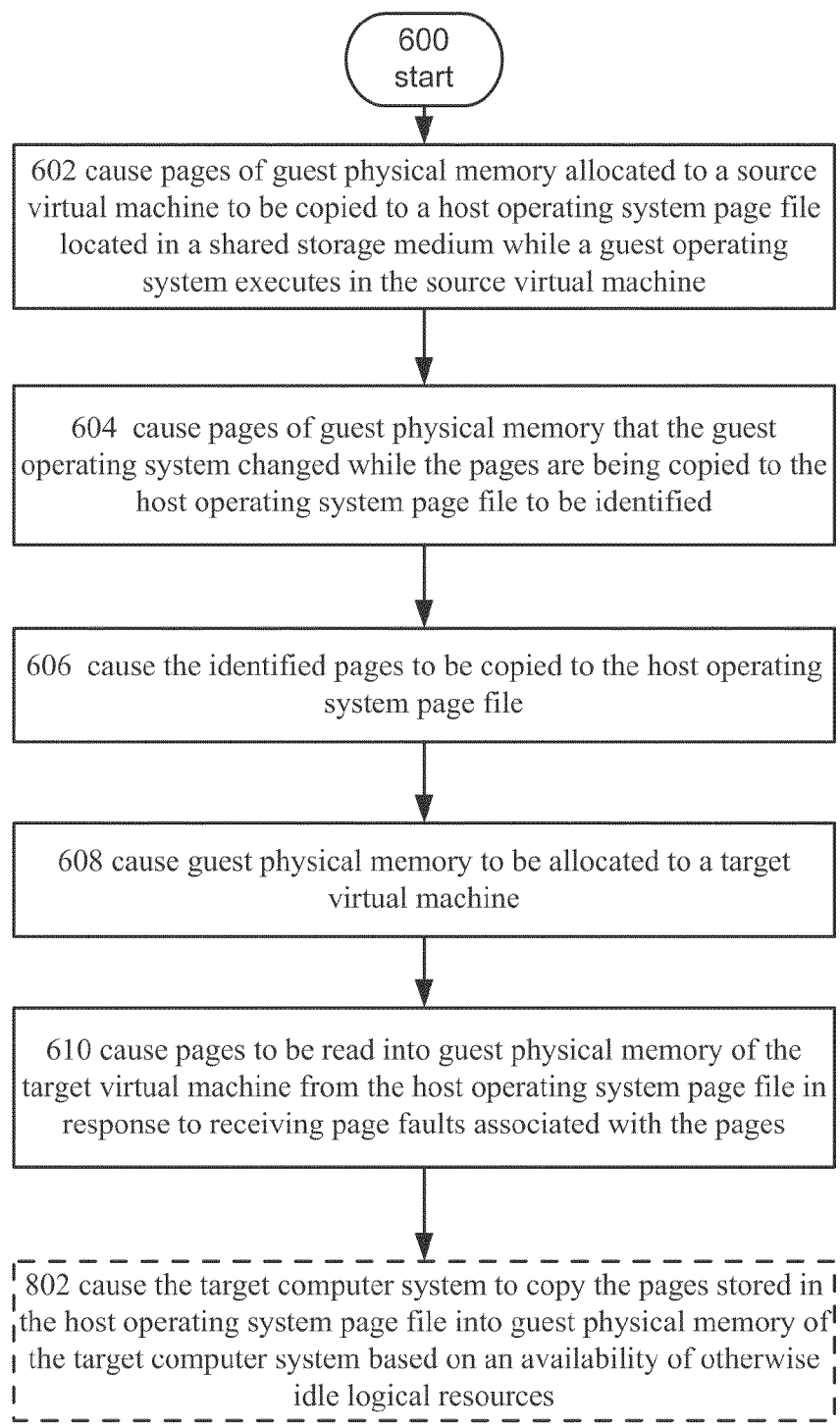
FIG. 8 illustrates an alternative embodiment of FIG. 6, wherein guest physical memory pages is copied into a target virtual machine.

FIG. 8 illustrates an alternative embodiment of the operational procedure of FIG. 6, including the additional operation 802. In this exemplary embodiment, virtualization module 400' can cause the target computer system to copy the pages stored in the host operating system page file into guest physical memory of the target computer system based on an availability of otherwise idle resources such as, for example, idle logical processors and/or network bandwidth or I/O storage bandwidth. For example, low-priority background page-in operations may take place to restore memory pages that have not yet been copied from shared storage 510 to the guest physical memory on the target computer system 508. The low-priority background page-in operations can run when, for example, a logical processor is free and otherwise idle until the saved state of VM 108 is loaded into VM 108'. Low-priority background page-in operations may improve performance because memory pages are paged-in to the virtual machine saved state before they are needed. It should be noted that because solely using on-demand paging-in may not page-in all of the memory pages, if it is desirable to delete page file 404 or saved-state file 516 from shared storage 510, low-priority background page-in operations may be desirable.

Figure 9:
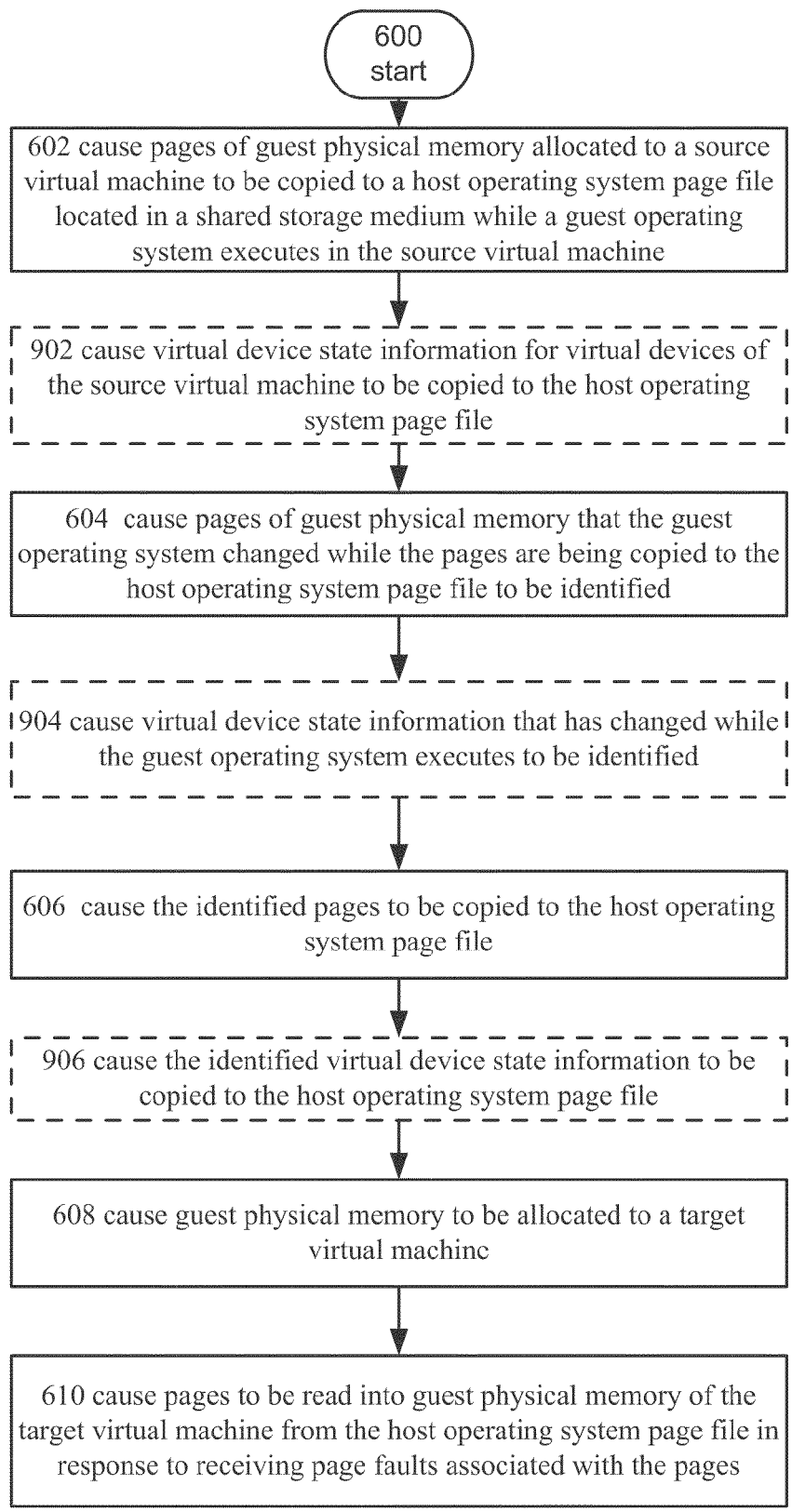
FIG. 9 illustrates an alternative embodiment of FIG. 6, illustrating operations for copying iteratively copying state information.

FIG. 9 illustrates alternative embodiments of FIG. 6, including additional operations 902-906. In an embodiment, virtual device state may be saved to page file 404. In another exemplary embodiment, virtual device sate may be iteratively saved to shared storage 510 during a save operation. In this exemplary embodiment, the actual implementation of both the way the modifications to the device state are identified and the way the device state is saved are specific to the individual virtual device. In at least one exemplary embodiment when one or more pages of guest memory are copied, virtualization module 400 can copy device state to shared storage.

In a specific example, the virtual device state of VM 108 can also be paged-out to shared storage 510 using second-level paging to save the states and subsequent changes to the states of the virtual devices to shared storage 510. Upon initiation of migration, virtual device state that have already been copied into shared storage 510 and have not been changed will not have to be copied again. In operation 902, virtualization module 400 of source computer system 506 can cause virtual device state information for virtual devices of the source virtual machine to be copied to the host operating system page file. During the save operation, virtualization module 400 can track the modifications to the virtual machine's virtual device states while VM 108 continues to run. In operation 904, virtualization module 400 of source computer system 506 can cause virtual device state information that has changed while the guest operating system executes to be identified. In operation 906, virtualization module 400 of source computer system 506 can cause the identified virtual device state information to be copied to the host operating system page file.

Figure 10:
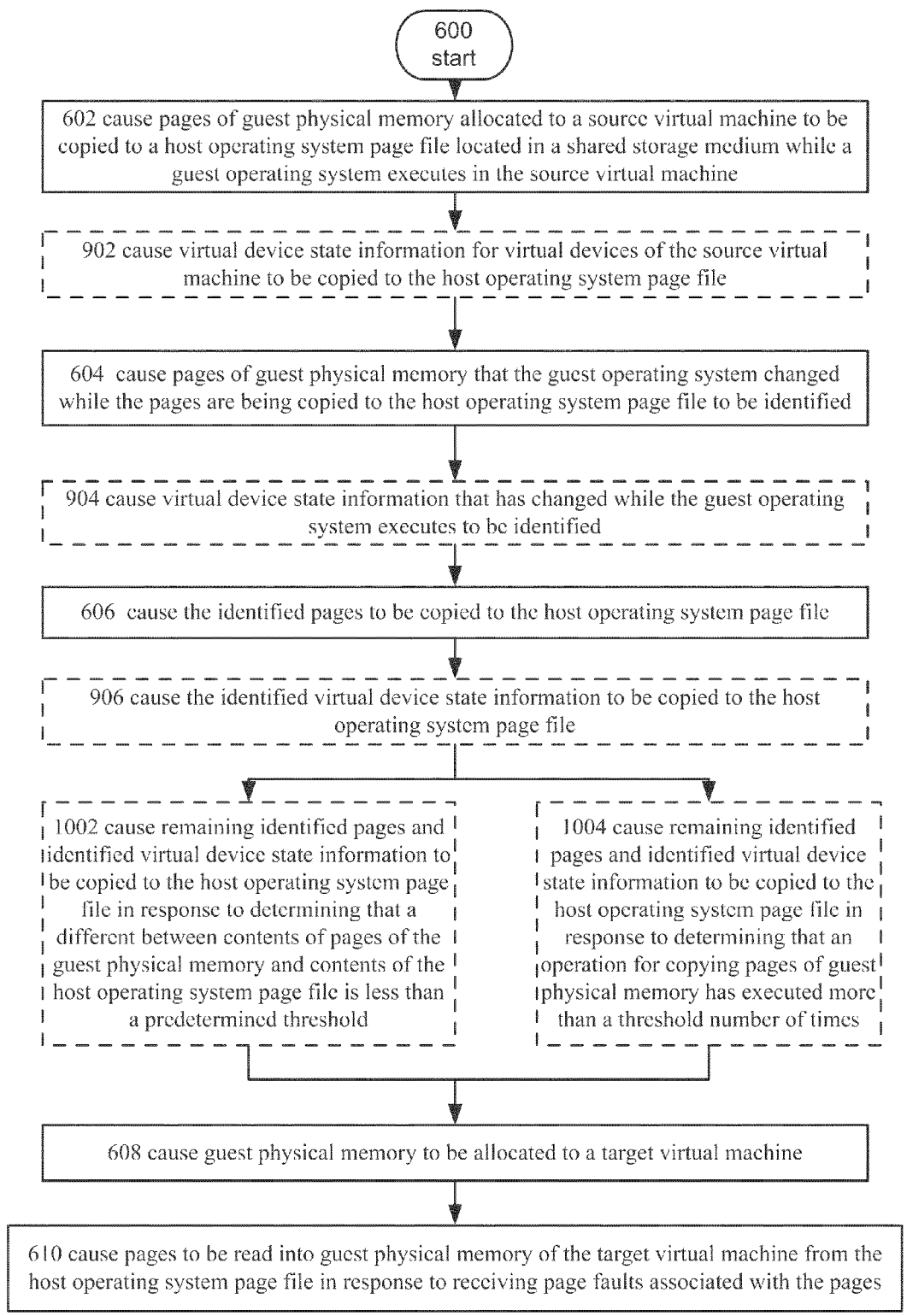
FIG. 10 illustrates an alternative embodiment of FIG. 9.

FIG. 10 illustrates alternative embodiments of the operational procedure described in FIG. 9, including additional operations 1002 and 1004. A decision may be made as to whether the difference between the saved state and the runtime state, which in this embodiment is comprised of the contents of the guest physical memory and the states of the virtual machine's virtual devices, is less than a threshold. In operation 1002, virtualization module 400 of the source computer system 506 can cause remaining identified pages and identified virtual device state information to be copied to a host operating system page file and/or a saved-state file 512 in response to determining that an amount of pages and/or device state changed by the guest operating system is less than a threshold. Alternatively or additionally, a decision may be made as to whether a maximum number of save passes has been reached. In operation 1004, virtualization module 400 of the source computer system 506 can cause remaining identified pages and identified virtual device state information to be copied to the host operating system page file and/or saved-state file 512 in response to determining that an operation for copying pages of guest physical memory has executed more than a threshold number of times. If the threshold has not been reached, the pages identified as having been changed since a previous save operation and any modified virtual device states are saved to shared storage 510 and the save operation is repeated. When the threshold comparison value is met, the execution of virtual machine 108 is paused on the source computer system 508 and the remaining modified pages and modified virtual device states are saved to the host operating system page file in the shared storage 510.

Figure 11:
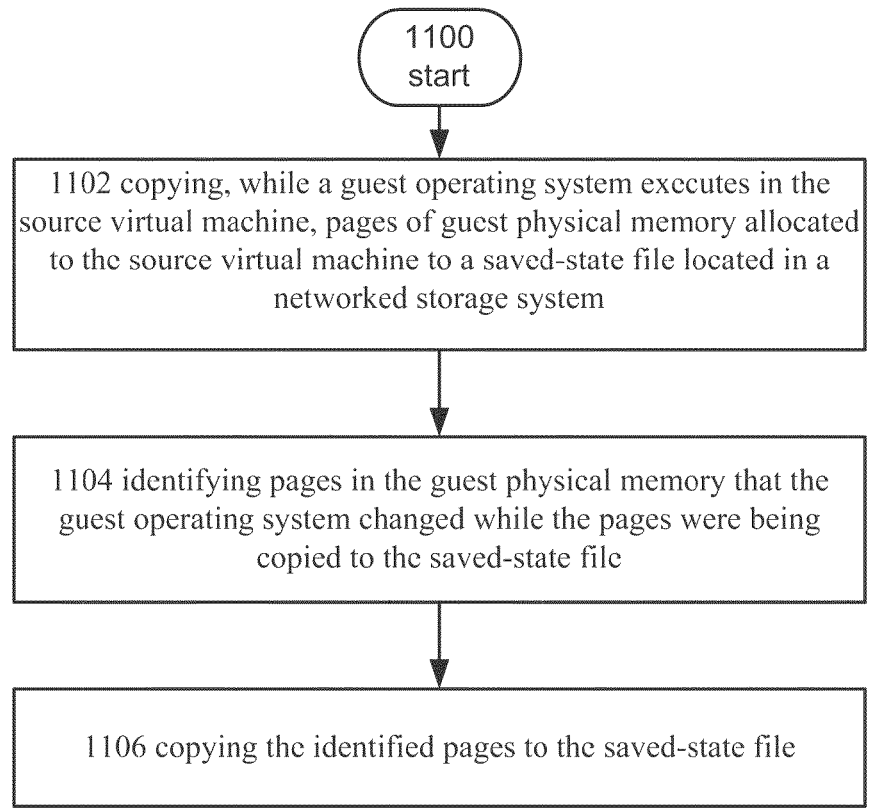
FIG. 11 depicts a generalized flow chart showing migration of a virtual machine using a saved-state file in shared storage.

FIG. 11 shows an illustrative, operational procedure for practicing aspects of the present invention including operations 1100-1106. In this exemplary embodiment, a saved-state file 512, which is a separate memory content file, may be created on shared storage 510 and used for the migration operation. Saved-state file 512 may be stored in a file system controlled by a host OS or hypervisor (in the instance that the target can access the host's file system); or it could be stored in a network file system, etc. Moreover, saved-state file 512 may be stored on a different physical device than virtual machine storage 516. Operation 1100 begins the operational process and operation 1102 illustrates that virtualization module 400 can copy, while a guest operating system executes in the source virtual machine, pages of guest physical memory allocated to the source virtual machine to saved-state file 512 located in a networked storage system, i.e., shared storage 510. Because virtual machine 108 continues to run during the save operation, the saved state may be continuously modified. In operation 1104, virtualization module 400 can identify pages in the guest physical memory that the guest operating system changed while the pages were being copied to the saved-state file. Virtualization module 400 tracks the modifications to by identifying pages of guest physical memory that change while virtual machine continues 108 to run during the save operation. In operation 1106, virtualization module 400 can copy the identified pages to saved-state file 512.

At this point, virtual machine 108 can be paused and, therefore, no more virtual machine memory modifications will occur. The state of the virtual machine's virtual devices and remaining modified state of virtual machine memory can be saved to saved-state file 512.

Figure 12:
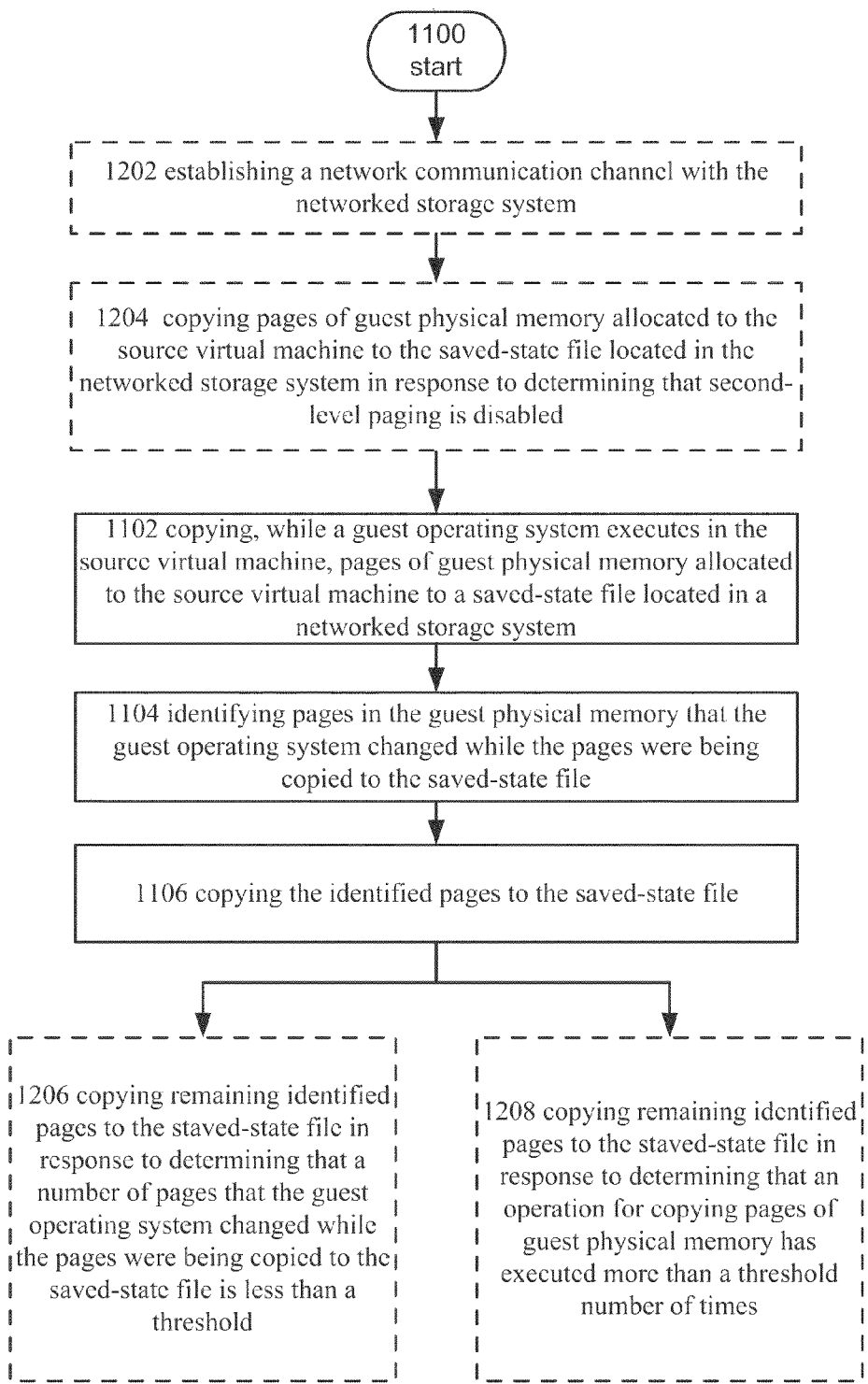
FIG. 12 illustrates an alternative embodiment of FIG. 11.

FIG. 12 illustrates alternative embodiments of the operational procedure of FIG. 11, including the additional operations 1202-1208. In an embodiment, and illustrated by operation 1202, prior to the migration operation, source computer system 506 can connect to shared storage 510.

In an exemplary embodiment, virtualization module 400 can be configured to use saved-state file 512 in the instance that second-level paging is disabled. In a specific example, virtualization module 400 can copy pages of guest physical memory allocated to the source virtual machine to saved-state file 512 located in the networked storage system in response to determining that second-level paging is disabled. For example, when virtualization module 400 runs, it can determine whether second-level paging is enabled. In the instant that it is disabled, virtualization module 400 can setup a saved-state file 512 on shared storage 510 and use it for a potential migration operation.

Turning to operation 1206, virtualization module 400 can be configured to copy remaining identified pages to the staved-state file in response to determining that a number of pages that the guest operating system changed while the pages were being copied to the saved-state file is less than a threshold. Alternatively or additionally, as shown by operation 1208, virtualization module 400 can be configured to copy remaining identified pages to the staved-state file in response to determining that an operation for copying pages of guest physical memory has executed more than a threshold number of times. When the threshold comparison value is met, the execution of the virtual machine is paused on source computer system 506 and the remaining modified pages, along with the state of the virtual devices, are saved to the saved-state file 512 in shared storage 510.

Figure 13:
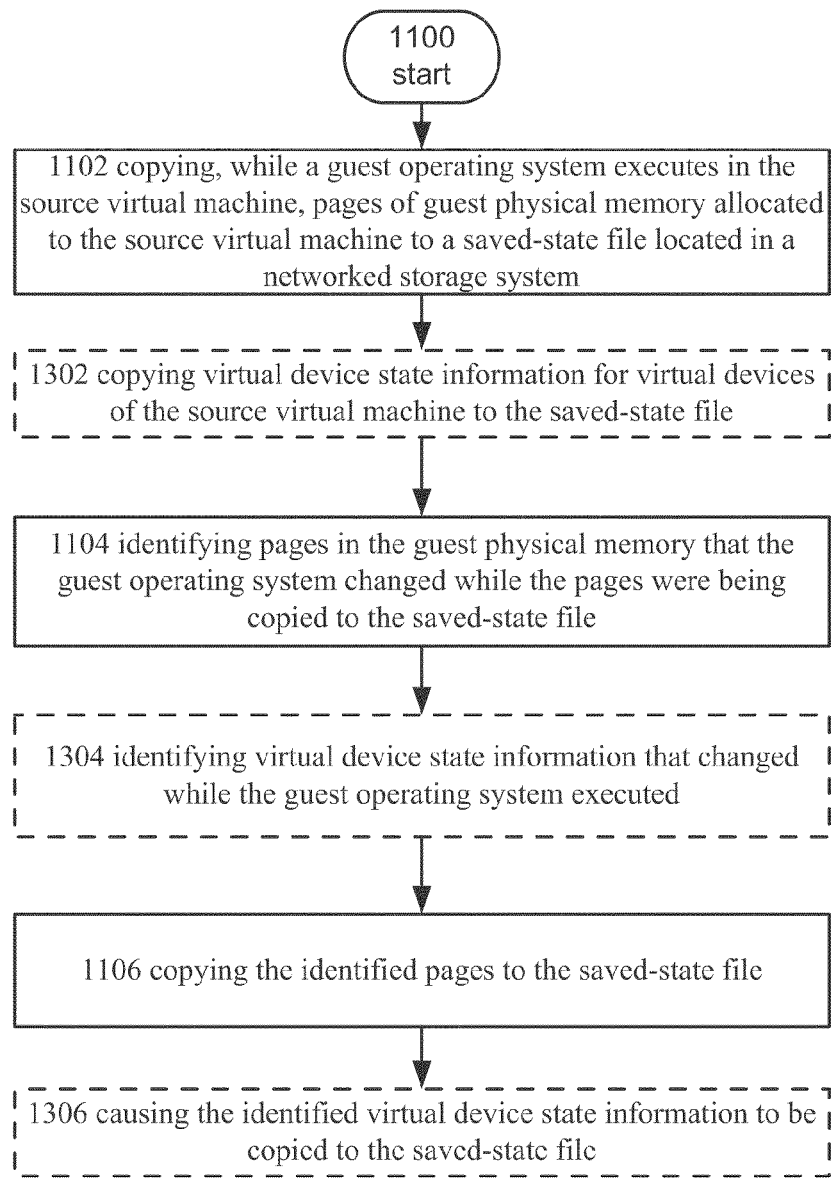
FIG. 13 illustrates an alternative embodiment of FIG. 11.

FIG. 13 illustrates alternative embodiments of FIG. 11, including additional operations 1302-1306. In an embodiment, virtual device state may be saved iteratively to shared storage 510 to facilitate faster migration for a virtual machine from a source computer system to a target computer system. In operation 1302, virtualization module 400 of source computer system 506 can copy virtual device state information for virtual devices of the source virtual machine to saved-state file 512. During the save operation, virtualization module 400 tracks the modifications to the virtual machine's virtual device states while VM 108 continues to run. In operation 1304, virtualization module 400 of source computer system 506 can identify virtual device state information that changed while the guest operating system executed. In operation 1306, virtualization module 400 of source computer system 506 can cause the identified virtual device state information to be copied to saved-state file 512.

Figure 14:
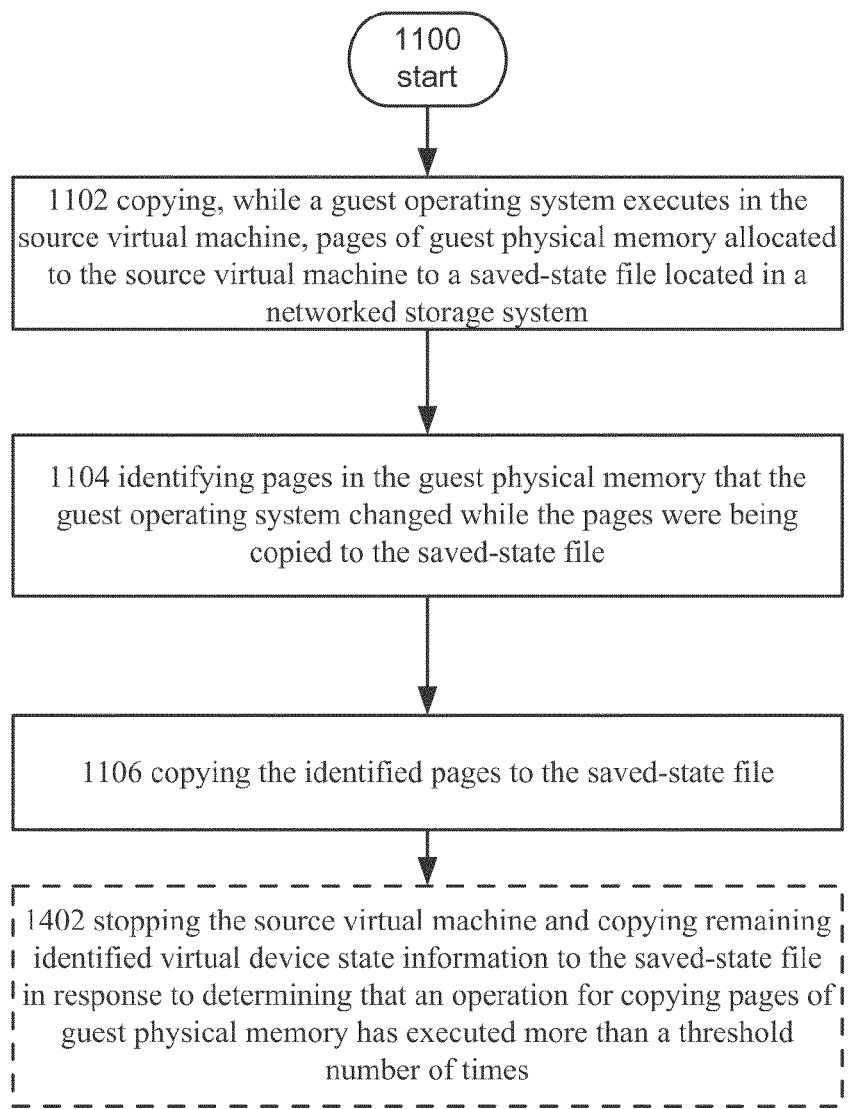
FIG. 14 illustrates an alternative embodiment of FIG. 11.

FIG. 14 illustrates an alternative embodiment of the operational procedure of FIG. 11, including the additional operation 1402 which states that virtualization module 400 can stop the source virtual machine and copying remaining identified virtual device state information to saved-state file 512 in response to determining that an operation for copying pages of guest physical memory has executed more than a threshold number of times. In this example, when virtual machine 108 is stopped, virtualization module 400 can copy the state information for remaining devices, e.g., virtual processors, virtual NICs, etc., to the staved-state file 512.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

By completing migration of a virtual machine via a shared storage device, a more efficient and cost effective computing environment may be provided. The benefit of using shared storage instead of a network connection as a medium for virtual machine migration may be that a dedicated network connection is not required. Although a dedicated network connection for the traditional live migration is not needed, it is preferable for avoidance of disruptions and security reasons. Shared storage as a medium negates this need. In addition, if a system uses Fibre Channel and shared storage such as a Storage Area Network (SAN), the bandwidth may be better than with a network connection.

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A computer readable storage device tangibly embodying instructions operable to initiate a migration operation to transfer a virtual machine from a source computer system to a target computer system, the computer readable storage device comprising:
   - instructions that upon execution by the source computer system cause pages of guest physical memory allocated to a source virtual machine to be copied to a host operating system page file located in a shared storage medium while a guest operating system executes in the source virtual machine;
   - instructions that upon execution by the source computer system cause pages of guest physical memory that the guest operating system changed while the pages of guest physical memory allocated to a source virtual machine are being copied to the host operating system page file to be identified;
   - instructions that upon execution by the source computer system cause the identified pages to be copied to the host operating system page file;
   - instructions that upon execution by the target computer system cause guest physical memory to be allocated to a target virtual machine; and
   - instructions that upon execution by the target computer system cause the pages copied to the host operating system page file to be read into guest physical memory of the target virtual machine from the host operating system page file in response to receiving page faults associated with the pages copied to the host operating system page file.

2. The computer readable storage device of claim 1, further comprising:
   - instructions that upon execution by the source computer system cause the source computer system to communicate with the shared storage medium via a network.

3. The computer readable storage device of claim 1, further comprising:
   - instructions that upon execution by the source computer system cause the source virtual machine to be stopped and remaining identified pages to be copied to the host operating system page file in response to determining that a difference between contents of pages of the guest physical memory and contents of the host operating system page file is less than a predetermined threshold.

4. The computer readable storage device of claim 1, further comprising:
   - instructions that upon execution by the source computer system cause the source virtual machine to be stopped and remaining identified pages to be copied to the host operating system page file in response to determining that an operation for copying pages of guest physical memory has executed more than a threshold number of times.

5. The computer readable storage device of claim 1, further comprising:
instructions that upon execution by the target computer system cause the target computer system to copy the pages copied to the host operating system page file into guest physical memory of the target computer system based on an availability of otherwise idle resources.

6. The computer readable storage device of claim 1, further comprising:
instructions that upon execution by the source computer system cause virtual device state information for virtual devices of the source virtual machine to be copied to the host operating system page file;
instructions that upon execution by the source computer system cause virtual device state information that has changed while the guest operating system executes to be identified; and
instructions that upon execution by the source computer system cause the identified virtual device state information to be copied to the host operating system page file.

7. The computer readable storage device of claim 6, further comprising:
instructions that upon execution by the source computer system cause remaining identified pages and identified virtual device state information to be copied to the host operating system page file in response to determining that a difference between contents of pages of the guest physical memory and contents of the host operating system page file is less than a predetermined threshold.

8. The computer readable storage device of claim 6, further comprising:
instructions that upon execution by the source computer system cause remaining identified pages and identified virtual device state information to be copied to the host operating system page file in response to determining that an operation for copying pages of guest physical memory has executed more than a threshold number of times.

9. Computer readable storage device of claim 1, further comprising:
instructions that upon execution by the source computer system cause the pages of guest physical memory allocated to the source virtual machine to be copied to the host operating system page file in response to determining that a number of pages of guest physical memory currently paged out to the host operating system page file is greater than a threshold.

10. A method for migrating a source virtual machine running on a source computer system to a target computer system, comprising:
copying, while a guest operating system executes in the source virtual machine, pages of guest physical memory allocated to the source virtual machine to a saved-state file located in a networked storage system shared and accessible by both the source computer system and the target computer system;
identifying pages in the guest physical memory that the guest operating system changed while the pages were being copied to the saved-state file;
copying the identified pages to the saved-state file; and
reading the pages copied to the saved-state file into guest physical memory of a target virtual machine running on the target computer system from the saved-state file located in the networked storage system wherein the target computer system has a separate physical memory from the source computer system physical memory.

11. The method of claim 10, further comprising:
establishing a network communication channel with the networked storage system; and
upon copying the identified pages to the saved-state file, transferring ownership of the networked storage system from the source computer system to the target computer system.

12. The method of claim 10, further comprising:
copying remaining identified pages to the saved-state file in response to determining that a number of pages that the guest operating system changed while the pages of guest physical memory allocated to the source virtual machine were being copied to the saved-state file is less than a threshold.

13. The method of claim 10, further comprising:
copying remaining identified pages to the saved-state file in response to determining that an operation for copying pages of guest physical memory has executed more than a threshold number of times.

14. The method of claim 10, further comprising:
copying pages of guest physical memory allocated to the source virtual machine to the saved-state file located in the networked storage system in response to determining that second-level paging is disabled.

15. The method of claim 10, further comprising:
copying virtual device state information for virtual devices of the source virtual machine to the saved-state file;
identifying virtual device state information that changed while the guest operating system executed; and
causing the identified virtual device state information to be copied to the saved-state file.

16. The method of claim 15, further comprising:
stopping the source virtual machine and copying remaining identified virtual device state information to the saved-state file in response to determining that a number of identified pages changed while the pages of guest physical memory allocated to the source virtual machine were being copied to the saved-state file is less than a threshold.

17. The method of claim 15, further comprising:
stopping the source virtual machine and copying remaining identified virtual device state information to the saved-state file in response to determining that an operation for copying pages of guest physical memory has executed more than a threshold number of times.

18. A system for enabling migration of a source virtual machine from a source computer system to a target computer system, comprising:
the source computer system including a source computer readable storage medium;
the target computer system including a target computer readable storage medium;
a networked storage system operatively coupled to the source computer system and to the target computer system;
wherein the source computer readable storage medium comprises:
instructions for causing pages of guest physical memory allocated to the source virtual machine to be copied to a virtualization module page file located in a shared storage medium;
instructions for causing pages in the guest physical memory that a guest operating system changed while the pages were being copied to the virtualization module page file to be identified;

instructions for causing the identified pages to be copied to the virtualization module page file;
instructions for causing guest physical memory to be allocated in a target virtual machine;
wherein the target computer readable storage medium comprises:
instructions for causing pages to be read into guest physical memory of the target virtual machine from the virtualization module page file in response to receiving page faults associated with corresponding pages in the guest physical memory of the target virtual machine.

19. The computer system of claim 18, wherein the source computer readable storage medium further comprises:
instructions for determining whether a number of pages in the guest physical memory that the guest operating system changed while the pages of guest physical memory allocated to the source virtual machine were being copied to the virtualization module page file is fewer than a maximum number;
instructions for determining whether a maximum number of save passes has been reached; and
instructions for causing remaining identified pages to be copied to the virtualization module page file.

20. The computer system of claim 18, wherein the source computer readable storage medium further comprises:
instructions for causing virtual device state of the source virtual machine to be copied to the virtualization module page file;
instructions for identifying virtual device state that the guest operating system changed while the states were being copied to the virtualization module page file.

* * * * *